Feb. 6, 1945.　　　G. W. BARNES, JR　　　2,368,912
MEASURING INSTRUMENT
Filed Nov. 2, 1943　　　3 Sheets-Sheet 1

INVENTOR.
GEORGE W. BARNES JR.
BY
*C. B. Spangenberg*
ATTORNEY

Feb. 6, 1945.　　　G. W. BARNES, JR　　　2,368,912
MEASURING INSTRUMENT
Filed Nov. 2, 1943　　　3 Sheets-Sheet 2

INVENTOR.
GEORGE W. BARNES JR.
BY
C B Spangenberg
ATTORNEY.

Feb. 6, 1945.  G. W. BARNES, JR  2,368,912
MEASURING INSTRUMENT
Filed Nov. 2, 1943  3 Sheets-Sheet 3

INVENTOR.
GEORGE W. BARNES JR.
BY
*EBSpangenberg*
ATTORNEY.

Patented Feb. 6, 1945

2,368,912

UNITED STATES PATENT OFFICE 2,368,912

MEASURING INSTRUMENT

George W. Barnes, Jr., Clifton Heights, Pa., assignor to The Brown Instrument Company, Philadelphia, Pa., a corporation of Pennsylvania Application November 2, 1943, Serial No. 508,740

10 Claims. (Cl. 171—95)

The present invention relates to drive units, and more particularly to a potentiometer type drive unit which may be directly attached to the object to be moved. The instrument of the present invention consists of a potentiometer type electrical network which is automatically rebalanced in response to unbalance thereof by a change in an input voltage by means of a reversible motor. This same motor is used to adjust simultaneously some device which will control the input voltage either directly or indirectly or which may be totally unrelated thereto.

It is an object of the present invention to provide a simple, compact instrument with a minimum of moving parts, and one in which all of the parts, both electrical and mechanical, which are necessary to its operation are located within a single small casing.

It is a further object of the invention to provide a self-balancing drive unit which will serve to operate directly some device which is to be adjusted accurately and without hunting to a given position.

The instrument of the present invention is described herein, by way of example, as being responsive to temperature and as being operative to adjust a value through which a temperature changing medium is flowing. It will be obvious to those skilled in the art, however, that the instrument could be made to respond to an electrical input from any source and could be made to operate any desired device in response thereto.

The various features of novelty which characterize my invention are pointed out with particularity in the claims annexed to and forming a part of this specification. For a better understanding of the invention, however, its advantages and specific objects obtained with its use, reference should be had to the accompanying drawings and descriptive matter in which I have illustrated and described a preferred embodiment of the invention.

Figure 1:
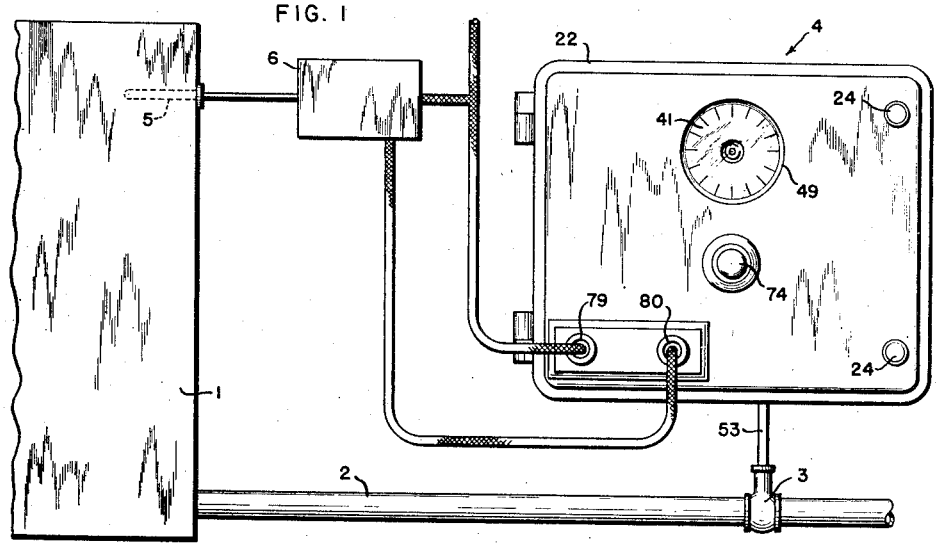
Figure 1 shows a control system.

Referring first to Figure 1, there is shown a heater 1 that is supplied with a temperature changing fluid, which may be either fuel or steam, through a pipe 2. The flow of fuel through the pipe 2 is controlled by a valve 3 that is operated directly by the instrument 4 of the present invention. As shown herein, the temperature of the furnace is measured by means of a thermocouple 5 that is connected by a suitable cable to the instrument 4 and to a conversion and amplifier unit 6. This latter unit is connected to the instrument 4 and both of them are connected to a power supply by suitable electric conductors being shown in cable form.

Figure 2:
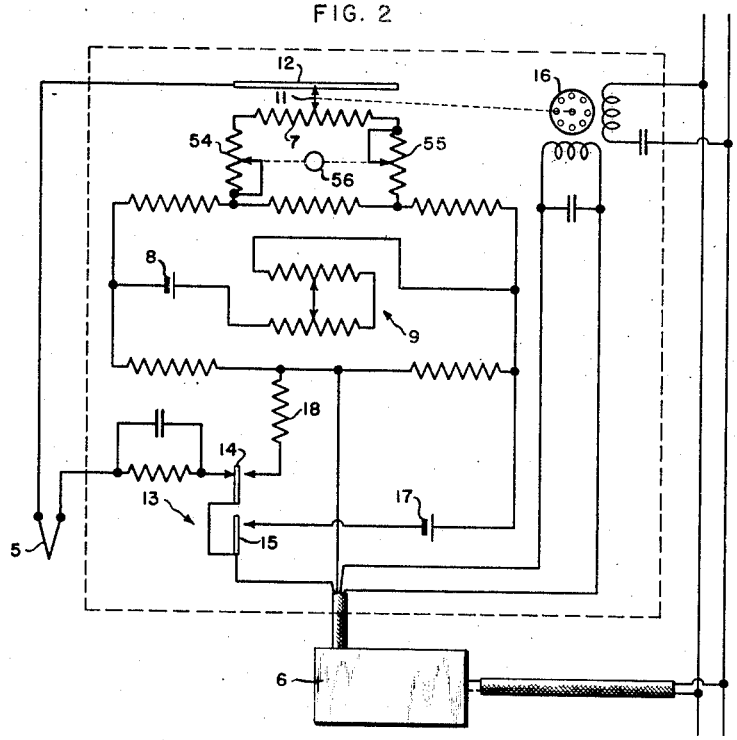
Figure 2 is a wiring diagram.

In Figure 2 there is shown a typical potentiometer circuit in which there is a slide-wire 7 that has a potential drop impressed across it by a battery 8 to produce a predetermined voltage drop; the battery preferably being in the form of a dry cell. Connected in circuit with the battery is a variable resistance 9 that is used to maintain constant the potential drop across the slide-wire 7 as the battery diminishes in power, in order to maintain the system in calibration. The voltage from the thermocouple 5 is impressed across a portion of the slide-wire 7 as determined by the position of a contact 11 between the slidewire and a parallel collector bar 12. As the thermocouple temperature changes the potentiometer circuit becomes unbalanced and this in turn is detected by the convertor and amplifier unit 6 to energize a motor 16 to shift the contact 11 along the slidewire in the proper direction and an amount to rebalance the potentiometer circuit. The details of the convertor and amplifier unit form no part of the present invention and are disclosed in the copending application of Walter P. Wills, Serial No. 421,173 and which was filed on December 1, 1941.

The thermocouple is normally connected in the circuit by means of a switch 13 which consists of a pair of movable contacts 14 and 15 and three stationary contacts that cooperate therewith.

In the operation of a potentiometer network of the type disclosed, upon the occurrence of a change in the temperature of the thermocouple 5 the potentiometer circuit will be unbalanced to cause a current flow therein. The convertor and amplifier unit will detect the direction and amount of this current flow, and correspondingly energize the motor 16 for rotation in one direction or the other. This motor is mechanically connected with the contact 11, in a manner to be described, so that the contact is shifted along the slidewire 7 and collector 12 to a position in which the potentiometer circuit is again balanced and no current flows in the circuit.

Due to the fact that the strength of battery 8 gradually diminishes with use it becomes necessary to adjust the resistance 9 from time to time in order to maintain the calibration of the instrument. At such times as the instrument is to be recalibrated or standardized, the movable contacts 14 and 15 of the switch 13 are pushed to the right to disconnect the thermocouple from the circuit to insert a standard cell 17 across a portion thereof and to simultaneously insert a shunt 18 around the unit 6. If the circuit needs recalibration a current flow will be set up in a manner similar to that produced by the thermocouple 5, producing an energization and rotation of the motor 16 in a direction an amount proportional to potentiometer unbalance at that time. This rotation of the motor is used to produce an adjustment of the resistance 9 by means which connects the resistance adjusting means to motor 16 when the thermocouple is removed from the potentiometer circuit and the standard cell is connected therein. The details of this will be described below.

It will also be seen from Figure 2 that the potentiometer circuit has in it various other resistances that are necessary for its calibration and operation. In addition, the motor has connected in circuit with it some condensers. These resistances and condensers along with the battery 8 and standard cell 17 are all located in the instrument 4 in a compact and space saving arrangement.

Figure 4:
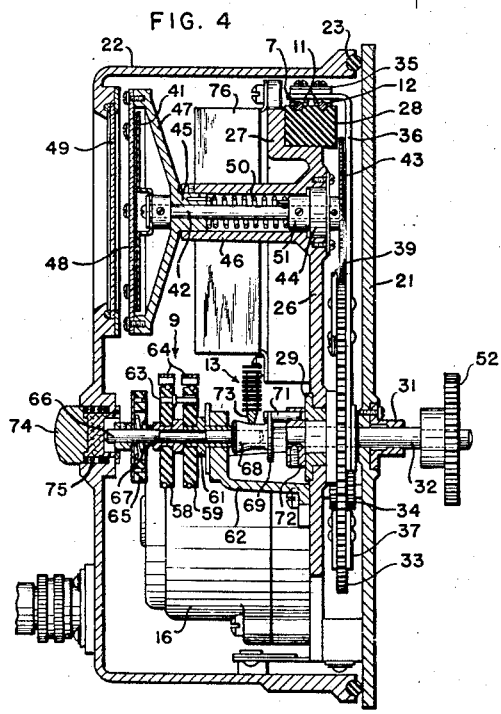
Figure 4 is a view taken on line 4—4 of Figure 3.

As shown in Figure 4 of the drawings, the mechanism of the instrument 4 is mounted in a casing that consists of a casting forming a supporting plate 21 and a cup-shaped cover 22 that is hinged thereto on the left side in Figure 1. The edge of the cover is provided with a depression which receives a gasket 23 that cooperates with the base 21 to make the casing dust tight. The cover is held in closed position by means of a pair of knobs 24 which have screw threaded projections on them that extend through the cover and are received by lugs 25 on the plate 21.

A casting 26 upon which various of the parts are mounted is fastened to the plate 21 in spaced relation thereto. The casting is formed with an arcuate shoulder 27 on it that receives and supports a similarly shaped member 28 of insulating material upon which the slide wire 7 and collector 12 are mounted.

Figure 3:
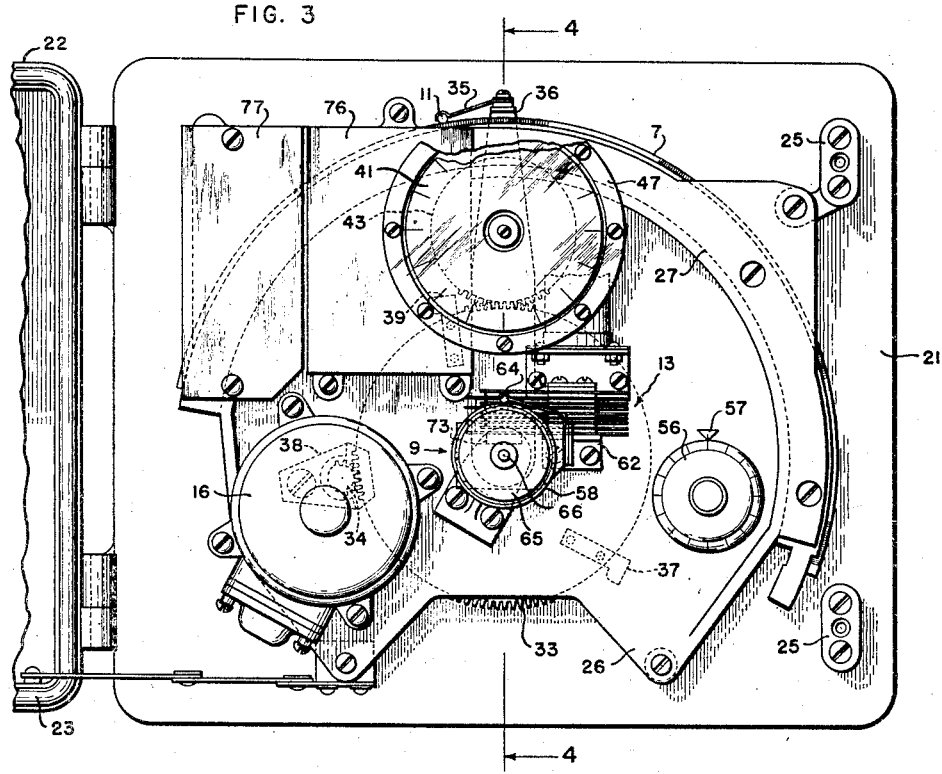
Figure 3 is a view of the instrument with the cover removed showing the location of the various parts.

A pair of bearings 29 and 31 are mounted in the casting 26 and plate 21, respectively, concentric with the slidewire support. Supported in these bearings is a shaft 32 that has on it, between the plate 21 and casting 26, a gear 33. This shaft is driven through its gear 33 by means of a pinion 34 that is driven by motor 16. The pinion is fixed to the shaft of motor 16, which shaft extends through the casting 26 so that the pinion is on the right side thereof while the motor is mounted on the left side of the casting as shown in Figure 3. As the motor 16 rotates due to unbalance of the potentiometer circuit it rotates the gear 33 and simultaneously moves the contact 11 along the slide wire. This is accomplished by mounting the contact 11 on a spring support 35 that is attached to the bent over end of an arm 36 which is fastened to the gear. Rotation of the motor and arm 36 are limited in a clockwise direction by engagement of a member 37 that is fastened to the gear 33 and a stop member 38 which surrounds and protects the pinion 34. Rotation of the arm in a counterclockwise direction is limited by engagement of a second member 39 with the other end of the stop 38. These members 37 and 39 are so placed on the gear 33 that it is permitted to rotate through approximately 170° which is equal to the arc covered by the slidewire and collector member.

An indication is given of the position of the contact 11 and of the value of the condition being measured by means of the rotative position of a disc 41 that is mounted on a shaft 42 which has a gear 43 on it that meshes with and is driven by the gear 33. The shaft 42 is rotatably mounted in a bushing 44 that is mounted in the casting 26 and a second bushing 45 that is fastened in a tubular extension 46 of the casting. A cover for the indicating disc 41 is formed by a conical flange 47 extending from the bushing 45 and a transparent plate 48 that is fastened to the flange 47. It is noted that the cover 22 also has a window 49 in it coaxial with the plate 48 so that indicating disc 41 may be seen when the cover is closed. In order to take up any back-lash in the gears there is provided a helical spring 50 which surrounds the shaft 42. This spring is maintained under tension at all times and has one end extending into a collar 51 on the shaft 42 and has its other end extending into the bushing 45.

As the motor 16 rotates in response to potentiometer unbalance to adjust the contact 11 and disc 41, it also adjusts the valve 3 in pipe 2. This is accomplished by attaching a gear 52 to an extension of the shaft 32 that extends rearwardly of the instrument casing through the plate 21. This gear meshes with a rack 53 on the valve stem.

In order to provide an adjustable control point in the instrument so that the temperature of the heater 1 may be controlled to different values, the potentiometer circuit is provided with a pair of adjustable resistors 54 and 55 that are in series with the slidewire 11. These resistors are simultaneously adjusted by a knob 56 to change the potential distribution along the slidewire and therefore the point to which the instrument will adjust the valve for a given heater temperature. As shown in Figure 3, the knob 56 is mounted on the casting 26 and is provided with temperature graduations and cooperates with a member 57 to indicate the control point for which the instrument is adjusted. Other ways may be provided to adjust the control point if desired.

The standardizing resistance 9 is also adjusted automatically by the motor 16 at such times as the leaves 14 and 15 of the switch 13 are moved to the right in Figure 2. As shown in Figures 3 and 4 of the drawings, the resistance 9 comprises a pair of independent resistance elements 58 and 59 that are mounted for rotation on a sleeve 61 which is supported coaxially with the shaft 32 by a bracket 62 fastened to the casting 26. In operation the element 58 is positively moved and serves to move the element 59 through a lost-motion connection consisting of a pin 63 projecting from element 58 through a short, arcuate slot in the element 59. The resistance elements move under a pair of stationary contacts 64. The above mentioned parts form a vernier resistance.

Rotation is imparted to the resistance elements by a clutch disc 65 that is attached to a shaft 66 and both of which are biased to the left in Figure 3 by a spring 67. The shaft 66 is rotatably mounted in the sleeve 61 and carries on its right end a cam member 68 that has a flange 69 formed on it. The shaft, disc and cam member are normally rotated when the motor 16 is energized by means of engagement between the sides of a notch formed in flange 69 and a pin 71 that projects from a collar 72 which is attached to the left end of the shaft 32.

In operation of the standardizing mechanism the shaft 66 is moved to the right to bring the right face of the clutch disc 65 into engagement with the left face of the element 58 so that the latter will be driven by the former. As this takes place the pin 71 will slide along the notch in flange 69 so that the drive between shafts 32 and 66 is not broken. This same movement of shaft 66 to the right is used to move switch leaves 14 and 15 of the standardizing switch 9 to the left in Figure 2 to disconnect the thermocouple 5 from the potentiometer circuit and connect the standard cell 17 and resistance 18 in the circuit in its place. This is accomplished by means of engagement between the cam 68 on shaft 66 and a thrust member 73 on the switch 9. Since the latter switch is of the well known telephone type, as shown in Figure 3, upward movement of the member 73 will operate the switch in a known manner. It is noted that the switch 9 is mounted in a position above the cam 68 by means of a portion of the bracket 62 as best shown in Figure 3.

The shaft 66 can be moved to the right to produce the standardizing operation either by pressing the left end of the shaft, if the cover 22 is open, or by pressing a button 74 on the cover if the latter is closed. The button is mounted for sliding movement in the door in a position coaxial with shaft 66. Normally the button 74 is held in its left position as shown in Figure 4 by a spring 75.

When the standard cell 17 is connected in the potentiometer circuit the circuit will be unbalanced an amount depending upon how much the voltage of dry cell 8 has diminished. The automatic rebalancing of the circuit will then adjust the resistance 9 enough to recalibrate the circuit. This movement of shaft 32 will make an adjustment of the valve 3 that is not in accordance with temperature changes, but the movement is so small that it will have no appreciable effect on the flow past the valve. It is noted that the more frequently the standardizing operation is performed, the smaller the movement imparted to the valve each time.

Figure 5:
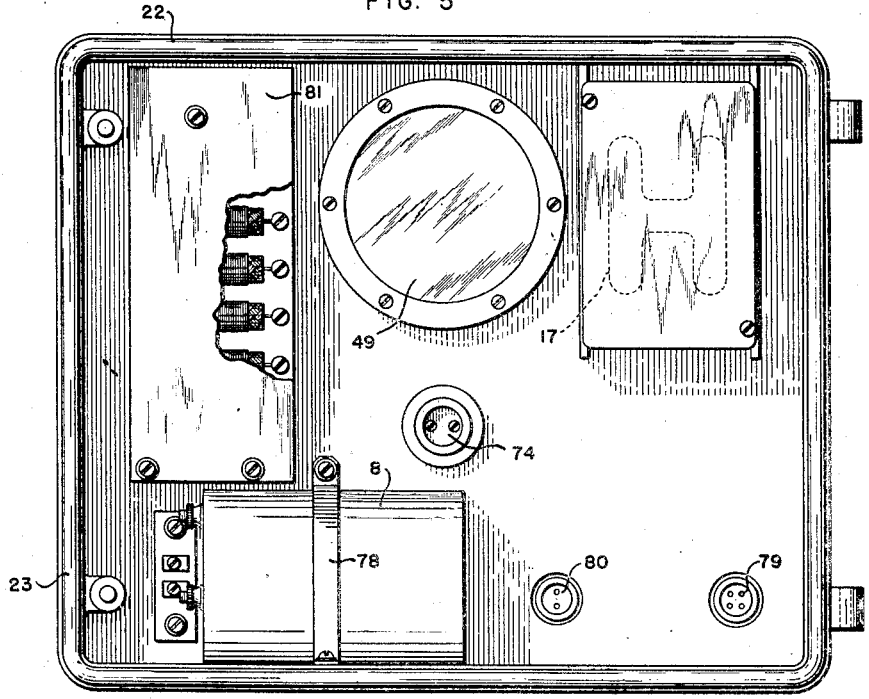
Figure 5 is a view of the inside of the cover.
Figure 6:
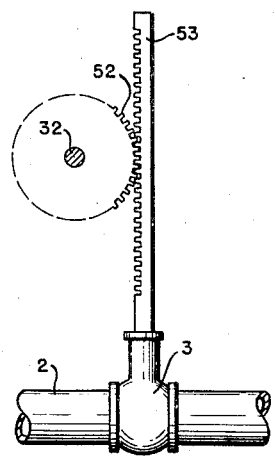
Figure 6 is a view of the valve and its operating gear.

In the drawings the various wires that extend between the parts have been omitted for the sake of clarity. The parts, however, are hooked up in the manner shown in the wiring diagram of Figure 2. Provision has been made for mounting on either the cover or the casting 26 all of the components of the potentiometer circuit as well as those mechanical elements that have been described. On the upper part of the casting to the right of the indicator 41 is located a compartment 76 in which the condensers for the motor are located. Next to this compartment is another compartment 77 in which is located a terminal block in which various of the connections are made. The terminal block is provided with a cover to prevent any possibility of a short circuit from occurring. On the inside of the cover 22 in the upper right corner is a compartment that receives the standard cell 17, while a strap 78 is provided to hold the dry cell 8 in place in the lower left portion. The dry cell is adjacent the left of the cover in Figure 5 to leave room for the lead in plugs 79 and 80 through which wires connecting the instrument with the amplifier, thermocouple and power supply may be brought. Also located in the cover is a compartment 81 in which the various resistors of the circuit are all located together.

The various compartments provided as they are for the components of the instrument permit each part to be readily accessible for adjustment and replacement when necessary. Having covers for each of the compartments increases the safety of the instrument as well as providing additional protection to prevent contamination of the parts by dirt when the cover is opened. The instrument is unusually compact and rugged.

While in accordance with the provisions of the statutes, I have illustrated and described the best form of my invention now known to me, it will be apparent to those skilled in the art that changes may be made in the form of the apparatus disclosed without departing from the spirit of my invention as set forth in the appended claims, and that in some cases certain features of my invention may sometimes be used to advantage without a corresponding use of other features.

Having now described my invention, what I claim as new and desire to secure by Letters Patent is:

1. A measuring instrument comprising a balanceable electrical network having a plurality of component parts including a slidewire, a contact moving in engagement with said slidewire and a standardizing resistance, a casing including a cover enclosing the various component parts, a motor also in said casing operable in response to network unbalance to move said contact relative to said slidewire to a position in which said network is rebalanced, a shaft driven by said motor, means to mount said standardizing resistance coaxial with said shaft, disengageable drive means coaxial with said shaft and standardizing resistance to drive the latter from the former, and means located in said cover and operable from the exterior thereof to engage said disengageable drive means whereby said standardizing resistance may be driven by said shaft.

2. In a measuring and control instrument, the combination of a support, a curved slidewire mounted on said support, a shaft concentric with said slidewire, a contact carried by said shaft and in engagement with said slidewire, means to rotate said shaft to move said contact to various positions along said slidewire, a variable resistance mounted coaxially with said shaft, adjusting means for said resistance including a second shaft coaxial with said first mentioned shaft and driven thereby, and a clutch between said second shaft and said resistance whereby said second shaft may adjust said resistance if said clutch is closed.

3. In an electrical measuring instrument, a support, a curved slide-wire on said support, a shaft journaled in said support and concentric with said slide-wire, a contact, means on said shaft including a gear to support said contact in engagement with said slidewire to be moved across the same as said shaft is rotated, a bracket extending from one side of said support, a variable resistance mounted on said bracket coaxial with said shaft, a second shaft slidably and rotatably mounted in said bracket coaxial with said shaft, means to rotate said second shaft from said first shaft, clutch means on said second shaft to adjust said variable resistance, and resilient means to normally slide said second shaft to a position in which said clutch is open.

4. The combination of claim 3 including a cover pivoted to said support and acting to cover the mechanism mounted thereon, and means mounted in said cover to slide said second shaft against the force of said resilience means to a position in which said clutch is closed.

5. In a measuring instrument, a support, a shaft rotatable in said support, a curved slidewire mounted on said support concentric with said shaft, a contact, means to move said contact across said slidewire by said shaft, a bracket projecting from said support, a pair of discs rotatably mounted on said bracket coaxial with said shaft, a second shaft slidably and rotatably mounted in said bracket coaxial with said first shaft, a clutch member on said second shaft adapted in one axial position of said second shaft to engage and rotate one of said discs and in another axial position of said second shaft not to engage said one of said discs, resilient means to normally maintain said second shaft in its other axial position, means at all times connecting said second shaft to be rotated by said first shaft when the latter rotates and means to rotate one of said discs from the other.

6. In a self-balancing measuring instrument a support, a curved slidewire mounted thereon, a shaft rotatably mounted in said support concentric with said slidewire, a contact mounted on said shaft and engaging with said slidewire, means to rotate said shaft and shift said contact along said slidewire, means to indicate the position of said contact including a second shaft parallel to said first shaft, a support in which said second shaft is journaled, an indicating member on said second shaft, gearing between said shafts, and resilient means always under tension surrounding said second shaft and acting on said second shaft and said support and operative to remove any back lash in said gearing whereby the position of said member will truly indicate the position of said contact.

7. In a measuring instrument, a support, a curved slidewire mounted on said support, a shaft rotatably mounted in said support concentric with said slidewire, a contact in engagement with said slidewire, means including a first gear to move said contact relative to said slidewire upon rotation of said shaft, a tubular projection extending from said support, a second shaft journaled for rotation in said projection, an indicating member on said second shaft, a second gear on said second shaft meshing with said first gear whereby rotation of said first shaft to move said contact will also rotate said second shaft to correspondingly move said member, and means to prevent play between said gears including a helical spring surrounding said second shaft and within said projection, said spring having one end attached to said second shaft and one end attached to said projection.

8. A measuring instrument comprising a balanceable electrical network having a plurality of component parts including a slidewire, a contact moving in engagement with said slidewire and a standardizing resistance, a casing including a cover enclosing the various component parts, motor means also in said casing and operable in response to network unbalance to move said contact relative to said slidewire to a position in which said network is rebalanced, a first shaft driven by said motor, a second shaft, means to at all times drive said second shaft from said first shaft, means to mount said standardizing resistance coaxial with said second shaft, disengageable drive means coaxial with said second shaft and standardizing resistance to drive the latter from the former, and means located in said cover and operable from the exterior thereof to engage said disengageable drive means, whereby said standardizing resistance may be driven from said second shaft.

9. In a potentiometer type control instrument, a casing including a cover for said instrument, a balanceable potentiometer network including a slidewire, a contact movable over said slidewire, a battery to impress a potential on said slidewire and a standard cell to check said potential, said parts being enclosed in said casing, a condition responsive means connected to said network and located outside of said casing, a shaft connected to relatively move said slidewire and contact, motor means operative upon unbalance of said network to rotate said shaft to relatively move said slidewire and contact to rebalance said network, said shaft extending through an opening in said casing, control means for the condition to which said condition responsive means is responsive, and means mounted directly on the extending end of said shaft to adjust directly said control means.

10. A compact self-balancing type potentiometer control instrument comprising a casing having a movable cover, a potentiometer network including a slidewire, a contact for said slidewire, a battery to impress a potential on said slidewire, a standard cell and a plurality of resistances, means to mount each of the parts included in said network in said casing, a motor mounted in said casing and engaged for rotation in one direction or an opposite direction depending upon unbalance of said potentiometer network, a shaft rotated by said motor to move said contact along said slidewire, connecting means between said shaft and said contact, a portion of said shaft extending through an opening in said casing, a condition responsive element located outside of said casing and connected to said potentiometer network, a condition adjusting means to adjust the condition to which said element is responsive, and means directly connected to the extending portion of said shaft to operate said condition adjusting means as said shaft rotates.

GEORGE W. BARNES, Jr.